(12) United States Patent
Kennedy

(10) Patent No.: US 9,300,143 B2
(45) Date of Patent: Mar. 29, 2016

(54) HIGH BANDWIDTH DATA TRANSPORT SYSTEM FOR USE IN A SMARTGRID

(71) Applicant: Lightwaves Systems, Inc., Cedar Rapids, IA (US)

(72) Inventor: Philip T. Kennedy, Cedar Rapids, IA (US)

(73) Assignee: Lightwaves Systems, Inc., Cedar Rapids, IA (US)

( * ) Notice: Subject to any disclaimer, the term of this patent is extended or adjusted under 35 U.S.C. 154(b) by 544 days.

(21) Appl. No.: 13/748,650

(22) Filed: Jan. 24, 2013

(65) Prior Publication Data

US 2013/0134774 A1 May 30, 2013

Related U.S. Application Data

(63) Continuation of application No. PCT/US2011/044637, filed on Jul. 20, 2011.

(60) Provisional application No. 61/400,322, filed on Jul. 26, 2010.

(51) Int. Cl.
| | |
|---|---|
| *H02J 4/00* | (2006.01) |
| *G06F 1/26* | (2006.01) |
| *H01R 13/66* | (2006.01) |
| *H02J 3/14* | (2006.01) |

(52) U.S. Cl.
CPC ... *H02J 4/00* (2013.01); *G06F 1/26* (2013.01); *G06F 1/266* (2013.01); *H01R 13/665* (2013.01); *H02J 3/14* (2013.01); *Y02B 90/226* (2013.01); *Y04S 20/16* (2013.01)

(58) Field of Classification Search
USPC ........................................................ 307/140
See application file for complete search history.

(56) References Cited

U.S. PATENT DOCUMENTS

| | | | |
|---|---|---|---|
| 6,842,668 B2 | 1/2005 | Carson et al. | |
| 7,099,785 B2 | 8/2006 | Lee et al. | |
| 8,209,413 B1* | 6/2012 | Turrichi et al. | 709/224 |
| 2009/0315485 A1 | 12/2009 | Verfuerth et al. | |
| 2010/0138363 A1 | 6/2010 | Batterberry et al. | |
| 2011/0187557 A1* | 8/2011 | Dietzler | 340/870.16 |
| 2011/0190967 A1* | 8/2011 | Burk | 701/22 |

FOREIGN PATENT DOCUMENTS

| | | |
|---|---|---|
| WO | WO2009081407 A2 | 7/2009 |
| WO | WO2012018526 A1 | 2/2012 |

OTHER PUBLICATIONS

Lightwaves Systems, Inc., PCT/US2011/044637 filed Jul. 20, 2011, "Notification of Transmittal of the International Search Report and the Written Opinion of the International Searching Authority, or the Declaration", mailed Nov. 29, 2011.

* cited by examiner

*Primary Examiner* — Robert Deberadinis
(74) *Attorney, Agent, or Firm* — McKee, Voorhees & Sease, PLC

(57) ABSTRACT

A method for controlling electricity usage in at least one building through a jack device to a power consuming device includes passing electric power from a powerline and through the jack device to the power consuming device, sensing characteristics of electricity being consumed by the power consuming device using the jack device, sending messages from the jack device about the characteristics of the electricity being consumed, and receiving messages to control the passing of the electric power through the jack device to the power consuming device. The jack device may use a pulse based protocol in sending the messages and receiving the messages through the powerline.

18 Claims, 4 Drawing Sheets

HIGH BANDWIDTH DATA TRANSPORT SYSTEM FOR USE IN A SMARTGRID

PRIORITY STATEMENT

This is a Continuation Application of Application No. PCT/US11/44637 filed Jul. 20, 2011, which application claims priority under 35 U.S.C. §119 to U.S. Provisional Patent Application No. 61/400,322, filed Jul. 26, 2010, all of which are incorporated by reference in their entirety.

FIELD OF THE INVENTION

The present invention provides devices, interfaces, and protocols for use in a SmartGrid system.

Problems in the Art

There are several trends in society that are creating an unprecedented need for a SmartGrid system with superior technical capabilities. Some of the current problems with SmartGrid enablement include:
1) Prohibitive cost to ubiquitously deploy SmartGrid devices in buildings
2) Lack of cyber-security
3) Lack of open standards
4) Lack of widespread data sharing
5) Lack of peaceful integration with in-building wired communications
6) Dependence on shared wireless connectivity for some SmartGrid devices
7) No signal isolation at the electric meter
8) No easy access to data for analysis
9) Lack of comprehensive types of event triggers Therefore, despite the potential advantages of SmartGrid systems problems remain. What is needed is a cost-effective solution that overcomes these problems, and other limitations of current technology.

SUMMARY OF THE INVENTION

The present invention is a comprehensive SmartGrid enabling technology that can be used in homes or business.

A general feature of the present invention is the provision of a system, method and apparatus for increasing the features and usability of SmartGrid technology, which overcomes the problems found in the prior art, which will become apparent from the specification and claims that follow.

A further feature of the present invention is inexpensive devices to allow for ubiquitous deployment A further feature of the present invention is enhanced cyber-security A further feature of the present invention is the use of comprehensive, open data or equipment standards A further feature of the present invention is the capability of widespread data sharing using a data cloud.

A further feature of the present invention is peaceful integration with in-building wired communications.

A further feature of the present invention is no dependence on shared wireless connectivity for SmartGrid devices.

A further feature of the present invention is signal isolation at the electric meter.

A further feature of the present invention is easy access to data for analysis.

A further feature of the present invention are comprehensive types of event triggers.

A further feature of the present invention is the possibility of large networks of up to 50,000 SmartGrid devices.

A further feature of the present invention is 300 bps/device data rates.

A further feature of the present invention is a short time to payback for customers.

A further feature of the present invention is the use of existing technologies such as, Bluetooth, WiFi, RFID, XML, Cascading Style Sheets, EPCglobal standards, etc., to create a system that can be quickly deployed, and interfaced with existing information and analysis systems.

A further feature of the present invention is plug and play devices that enable the present invention that plug into existing electrical outlets.

A further feature of the present invention is the provision of a TimeFlux SG master device to interface with systems and databases outside the TimeFlux SG enabled building.

A further feature of the present invention is the provision of a TimeFlux SG master device which also serves as a controlled point to concatenate and compare data that has been collected from the TimeFlux SG UltraJack devices.

A further feature of the present invention is the provision of a TimeFlux SG master device which also serves as a central point for real time energy audits of specific, individual devices attached to UltraJacks.

A further feature of the present invention is the use of modified TimeFlux communication technology.

It is to be understood that no single embodiment of the present invention need include all of these features. It is to be understood that different embodiments may have different features.

DETAILED DESCRIPTION OF THE PRESENT INVENTION

The present invention provides a SmartGrid enabling technology is that may be used in homes or business. According to one aspect, the present invention provides a platform to discern detailed energy use devices connected to the jack devices of the present invention (sometimes referred to herein as ULTRA JACK devices), a platform to compare data, a platform to guide improvements in homes and commercials buildings, and a platform that can drive the implementation of energy efficiency decisions.

A useful SmartGrid system depends on information to make "smart decisions". Information is Power. The information needed to make "smart decisions" in the present invention can be collected for each individual device plugged into an UltraJack, such as, but not limited to, TVs, computers, computer monitors, laptops, scanners, faxes, battery chargers, routers, switches, hubs, refrigerators, microwaves, lights, radios, alarm clocks, clock radios, stereos, smoke detectors, radon detectors, CO2 detectors, security systems, security cameras, sump pumps, HVAC equipment, garage door openers, power strips, garbage disposals, answering machines, game boxes, set-top boxes, DVD players, CD players, DVRs, washers, dryers, electric dog fences, exhaust fans, dehumidifiers, power tools, light switches, industrial and manufacturing equipment, electronic test equipment, medical equipment, electric car charging stations, razors, magnetic stripe readers, cash registers, gas pumps, freeway signs, digital photo frames, air purifiers, ceiling fans, bug zappers, WiFi equipment, modems, etc.

The SmartGrid system is based on an UltraJack that may be designed to plug into an existing, standard 110 volt power plug in order to provide power, sensing, and communication capabilities. However, the UltraJack can be configured to plug into any type of power plug regardless of the particular form factor.

Figure 1:
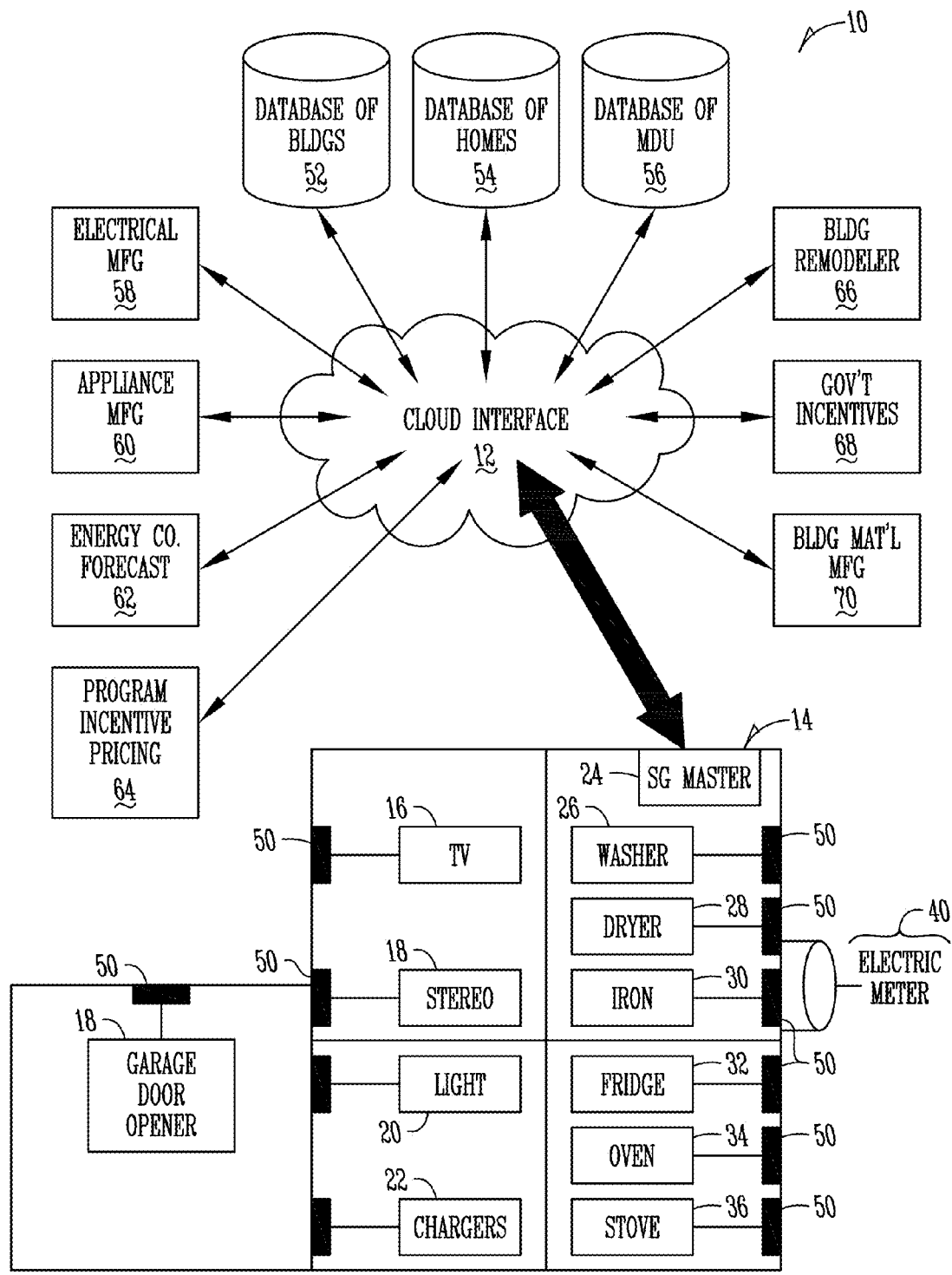
FIG. 1 is an illustration of one embodiment of the present invention.

FIG. 1 illustrates one example of a system 10. The system 10 includes a cloud interface 12. The home 14 has a SmartGrid (SG) master device 24 which can communicate with the cloud interface 12. Through the cloud interface 12, the SmartGrid master device 24 can communicate with systems and databases outside of the home 14.

Within the home 14, there are a plurality of jack devices 50 which are sometimes referred to herein as ULTRAJACK devices. The jack devices 50 may plug into electrical outlets throughout the home 14 and provide power to any number of types of devices or appliances such as a television 16, a stereo 18, a light 20, chargers 22, a washer 26, a dryer 28, an iron 30, a refrigerator 32, an oven 34, a stove 36, or a garage door opener 38. An electrical meter 40 is also shown which is electrically connected to the jack devices 50 located throughout the home 14.

Any number of systems and databases outside of the home 14 may communicate through the cloud interface 12 with the SmartGrid master device 14. These may include, without limitation, electrical manufacturers 58, appliance manufacturers 60, energy company forecasters 62, programs for incentive pricing 63, databases of buildings 52, databases of homes 54, databases of multiple dwelling units 56, building remodelers 66, government incentive programs 68, and building material manufactures 70. Although examples are given, it is to be appreciated that information regarding energy usage and related information may be communicated to any number of remote systems or databases and used for any number of purposes.

Figure 2A:
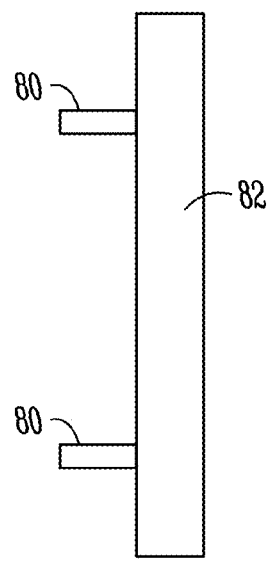
FIGS. 2A, 2B, and 2C illustrate one embodiment of a jack device sometimes referred to herein as an ULTRAJACK device.
Figure 2B:
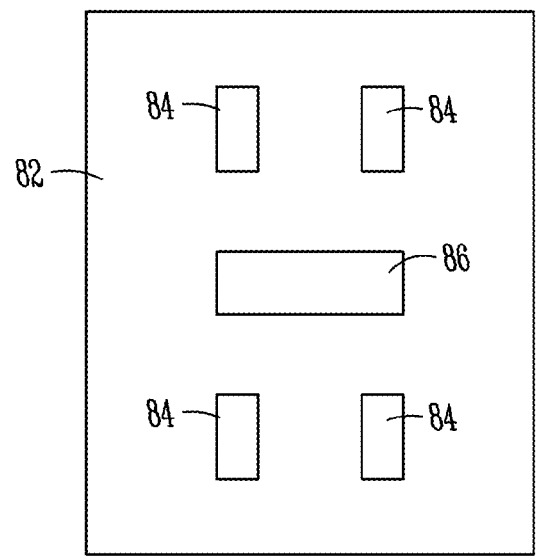

FIG. 2A provides a side view of one embodiment of a jack (ULTRAJACK) device 50. The jack device 50 includes a plurality of male prongs 80 extending from its housing for plugging into an electrical outlet. FIG. 2B illustrates a front view of the jack device 50 of FIG. 2A. The jack device has a plurality of openings 84 within its housing for receiving the male prongs of an electrical device. A button or switch 86 is also provided on the housing which may be used to turn power on or off to devices plugged into the jack device 50.

Figure 2C:
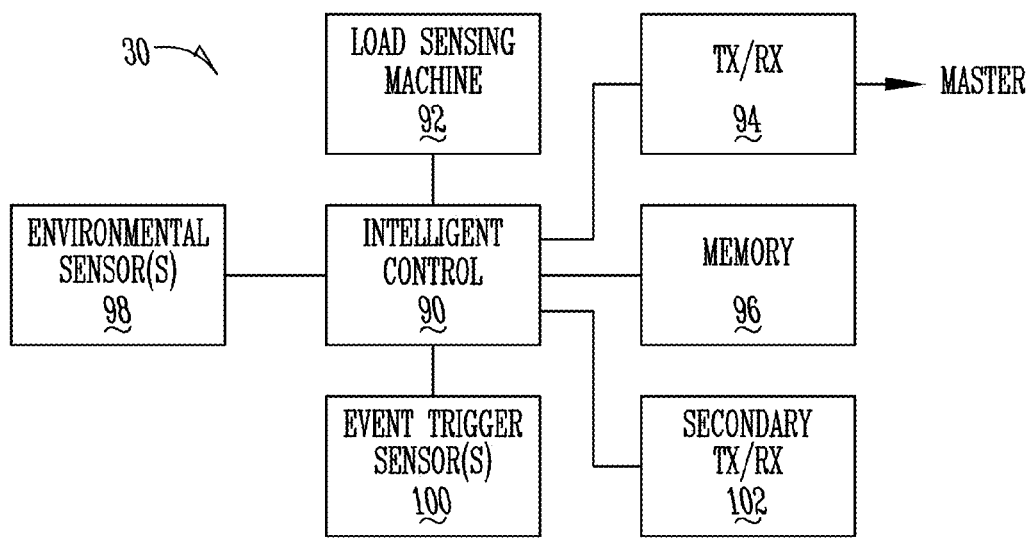

FIG. 2C is a block diagram illustrating one embodiment of the jack device 50. The jack device 50 may include an intelligent control 90. A load sensing module 92 may be electrically connected to the intelligent control. A transceiver or transmitter/receiver 94 may also be operatively connected to the intelligent control. The transmitter/receiver 94 allow for communication between the jack device 50 and a master device. A memory 96 may also be operatively connected to the intelligent control 90. The memory 96 may be in the form of a machine readable storage medium or non-transitory storage medium. Environmental sensors 98 may also be operatively connected to the intelligent control 90. Event trigger sensors 100 may also be operatively connected to the intelligent control 90.

The UltraJack device in its preferred embodiment, is in the form factor of a faceplate that is an electrical plug (single outlet, dual outlet, quad outlet, etc.) that plugs into an existing electrical outlet (single outlet, dual outlet, quad outlet, etc.). The UltraJack device provides power to any electrically powered device, and includes an electrical load sensing capability, and may also include a switch that can be used to supply power, or cut power, to any device that is drawing electrical power through the UltraJack device. The UltraJack device is constructed of the following components at a minimum:

1) Male electrical pronged plug for plugging into an existing electrical outlet
2) Electrical load sensing capability for monitoring factors such as, but not limited to, voltage, wattage, amperage, resistance, etc.
3) A TimeFlux SG Tx/Rx for receiving and transmitting messages and data to and from the SG Master
4) Compute and memory capabilities for performing operations based on received messages from the SG Master, storing data, storing messages, etc. The UltraJack can be constructed of hardware and software components to create the above functionality including, but not limited to: field programmable gate arrays (FPGA), FPGA Intellectual Property cores, ASIC, processors, device drivers, digital signal processors (DSPs), Ethernet, FireWire, Open Peripheral Bus, DMA, real time operating systems (RTOS), debug ports, Microkernel, memory (RAM, ROM, Flash, disk), memory management, file management, digital to analog converters, analog to digital converters, phased-locked loops, clocks and other standard electrical components, boards and housing one skilled in the art would recognize as required to integrate components into a transmitter and receiver.
5) Event trigger sensing capabilities, such as, but not limited to, sound, light, electrical signals, etc.
6) Optionally, the UltraJack may include RFID, Bluetooth, WiFi, cellular capabilities that can be used to identify a person, and/or communicate with a person who is within range of the UltraJack. In addition, the UltraJack can also act according to a sensed user's preferences such as, but not limited to, adjusting lighting conditions; turning on devices such as, but not limited to, a TV, stereo, coffee maker, etc.; turning a security system on or off.
7) The UltraJack device can also include sensors such as, but not limited, Radon, CO, etc., activate an alarm, or send a message to a user's device, such as, but not limited to, a cell phone, iPAD, iPhone, pager, laptop, netbook, PC, etc.
8) The UltraJack device can Tx/Rx TimeFlux pulsed proprietary messages and communications, or alternatively, can Tx/Rx messages and communications formatted according at any standard, such as, but not limited to, non-TimeFlux-based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4k (V.32bis), Modem 19.2k (V.32terbo), Modem 28.8k (V.34), Modem 33.6k (V.34plus/V.34bis), Modem 56k (V.90), and Modem 56k (V.92), 64k ISDN and 128k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2, OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor—Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, FC, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture(AMBA), Advanced High performance Bus(AHB), Xilinx Microblaze microprocessor busses including, but not limited to, Fast Simplex Link(FSL), On-chip Peripheral Bus (OPB), Local Memory Bus(LMB), and Xilinx PowerPC microprocessor busses including, but not limited to, On-chip Peripheral. Bus(OPB), Processor Local Bus(PLB), Device Control Register(DCR) bus, Altera Nios II microprocessor bus including, but not limited to, Avalon Interface, and Latice LatticeMicro32 open IP microprocessor core bus including, but not limited to, Wishbone.

9) The UltraJack device is also capable of operating as an XML-aware capable switch. The XML-aware capable switch receives XML data from the ultra wideband pulses or impulses over a conductive medium modem, makes decisions based on the XML header, opens the data packets, transforms or encrypts the XML data into a format that can be understood by the network, and transfers it to the non-ultra wideband pulses or impulses over wire communication modem. Also, the XML-aware capable switch receives XML data from the non-ultra wideband pulses or impulses over wire communication modem makes decisions based on the XML header, opens the data packets, transforms or encrypts the XML data into a format that can be understood by the network, and transfers it to the ultra wideband pulses or impulses over conductive medium modem. The XML data can be geographic data that can be used for routing and a wide variety of location-based services. The XML data can be network timing data that can be used for routing and for a wide variety of location-based services. The network timing data can originate from a GPS source. The UltraJack device may also be capable of operating as a DataSpace switch as described in U.S. patent application Ser. No. 10/345,766, entitled System And Method For Storing/Caching Data On Transmission Infrastructure, which is hereby incorporated by reference in its entirety. The UltraJack device may also be capable of operating as a structured linear database-aware switch as described in U.S. Pat. Nos. 6,868,419 and 6,868,419, entitled Method of Transmitting Data Including A Structured Linear Database, which are both hereby incorporated by reference in its entirety.

10) The UltraJack device may be integrated directly into devices such as, but not limited to, modems, PC boards, cell phones, set-top boxes, televisions, GPS receivers, ATM machines, landline phones, VoIP wireless phones, VoIP landline phones, DLC equipment, digital cameras, electrical outlets, interface devices that plug into electrical outlets, iPODs, Rios, etc., DVD players/recorders, on card/board communications, on back-plane communications, RFID readers, computer mouse, PDAs, computers, laptops, notebooks, eternal hard drives, CD burners, DVD burners, gaming equipment—X Box, Nintendo, etc., camcorders, copiers, fax machines, printers, cash registers, bar code readers, LCD projectors, PBXs, home networking devices, entertainment centers, PVRs, wireless/wire line switch (couplers), sensors, clocks, audio speakers, servers, powerline jumpers (breaker box), DSLAMs, ISLAMs, amplifiers, monitors, video displays, RFID tags (non-UWB), RFID tags (UWB), smart cards, Cable TV head-end and field equipment, Cable TV CPE equipment, Broadband Powerline (BPL) head-end and field Equipment, BPL CPE equipment, in-building powerline communication system controllers, database controllers, etc.

Figure 3:
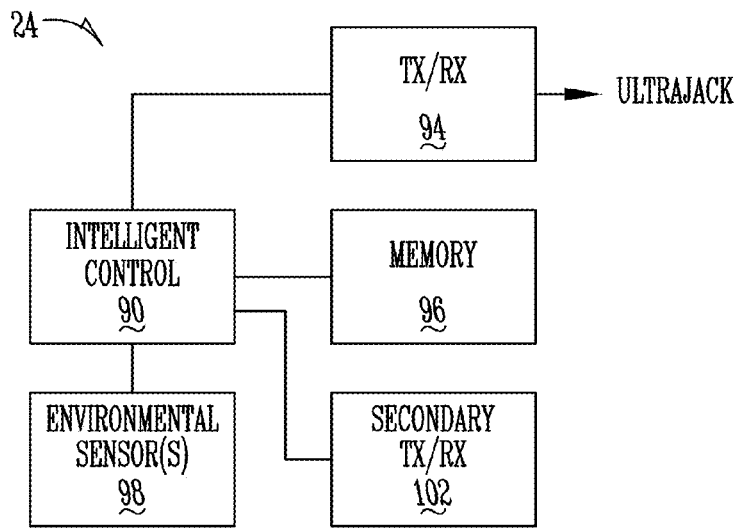
FIG. 3 illustrates one embodiment of a master device, sometimes referred to herein as a TimeFlux SG master device.

FIG. 3 illustrates one example of a SmartGrid (SG) Master device 24. The SG Master devices includes a transmitter/receiver or transceiver 94 which may implement TimeFlux SG for communications with ULTRAKACJ devices. The master device 24 further includes an intelligent control 90 which is operatively connected to a machine readable memory 96. The intelligent control 90 may also be operatively connected to one or more environmental sensor(s) 98 and a secondary transmitter/receiver 102.

The SG Master device may be in the form factor of a communications' switch or router. The SG Master device is constructed of the following components:

1) A TimeFlux SG Tx/Rx for receiving and transmitting messages and data to and from the SG Master to up to 50,000 UltraJack Devices.
2) Compute and memory capabilities for performing operations based on received messages from the SG Master, storing data, storing messages, etc. The SG Master can be constructed of hardware and software components to create the above functionality including, but not limited to: field programmable gate arrays (FPGA), FPGA Intellectual Property cores, ASIC, processors, device drivers, digital signal processors (DSPs), Ethernet, FireWire, Open Peripheral Bus, DMA, real time operating systems (RTOS), debug ports, Microkernel, memory (RAM, ROM, Flash, disk), memory management, file management, digital to analog converters, analog to digital converters, phased-locked loops, clocks and other standard electrical components, boards and housing one skilled in the art would recognize as required to integrate components into a transmitter and receiver.
3) Optionally, the SG Master may include RFID, Bluetooth, WiFi, cellular capabilities that can be used to identify a person, and/or communicate with a person who is within range of the SG Master. In addition, the SG Master can also act according to a sensed user's preferences such as, but not limited to, adjusting lighting conditions; turning on devices such as, but not limited to, a TV, stereo, coffee maker, etc.; turning a security system on or off.
4) The SG Master device can also include sensors such as, but not limited, Radon, CO, etc., activate an alarm, or send a message to a user's device, such as, but not limited to, a cell phone, iPAD, iPhone, pager, laptop, netbook, PC, etc.
5) The SG Master device can Tx/Rx TimeFlux pulsed proprietary messages and communications, or alternatively, can Tx/Rx messages and communications formatted according at any standard, such as, but not limited to, non-TimeFlux-based communication protocols include, but are not limited to, MOCA, Home PNA, HomePlug Standard, tZero UltraMIMO, Modem 110 baud, Modem 300 baud (V.21), Modem Bell 103 (Bell 103), Modem 1200 (V.22), Modem Bell 212A (Bell 212A), Modem 2400 (V.22bis), Modem 9600 (V.32), Modem 14.4k (V.32bis), Modem 19.2k (V.32terbo), Modem 28.8k (V.34), Modem 33.6k (V.34plus/V.34bis), Modem 56k (V.90), and Modem 56k (V.92), 64k ISDN and 128k dual-channel ISDN, Serial RS-232, Serial RS-232 max, USB Low Speed, Parallel (Centronics), Serial RS-422 max, USB Full Speed, SCSI 1, Fast SCSI 2, FireWire (IEEE 1394) 100, Fast Wide SCSI 2, FireWire (IEEE 1394) 200, Ultra DMA ATA 33, Ultra Wide SCSI 40, FireWire (IEEE 1394) 400, USB Hi-Speed, Ultra DMA ATA 66, Ultra-2 SCSI 80, FireWire (IEEE 1394b) 800, Ultra DMA ATA 100 800, Ultra DMA ATA 133, PCI 32/33, Serial ATA (SATA-150), Ultra-3 SCSI 160, Fibre Channel, PCI 64/33, PCI 32/66, AGP 1x, Serial ATA (SATA-300), Ultra-320 SCSI, PCI Express (x1 link), AGP 2x, PCI 64/66, Ultra-640 SCSI, AGP 4x, PCI-X 133, InfiniBand, PCI Express (x4 link), AGP 8x, PCI-X DDR, HyperTransport (800 MHz, 16-pair), PCI Express (x16 link), iSCSI (Internet SCSI), and HyperTransport (1 GHz, 16-pair), IrDA-Control, 802.15.4 (2.4 GHz), Bluetooth 1.1, 802.11 legacy, Bluetooth 2, RONJA free source optical wireless, 802.11b DSSS, 802.11b+ non-standard DSSS, 802.11a, 802.11g DSSS, 802.11n, 802.16 (WiBro) and 802.16 (Hiperman), GSM CSD, HSCSD, GPRS, UMTS, CDMA, TDMA, DS0, Satellite Internet, Frame Relay, G.SHDSL, SDSL, ADSL, ADSL2, ADSL2Plus, DOCSIS (Cable Modem), DS1/T1, E1, E2, E3, DS3/T3, OC1, VDSL, VDSL, VDSL2, OC3, OC12, OC48, OC192, 10 Gigabit Ethernet WAN PHY, 10 Gigabit Ethernet LAN PHY, OC256, and OC768, LocalTalk, ARCNET, Token Ring, Ethernet (10base-X), Fast Ethernet (100base-X), FDDI, and Gigabit Ethernet (1000base-X), Intelligent Transportation System Data Bus (ITSDB), MIL-STD-1553, VoIP (Voice over IP) standard signaling protocols, such as, but not limited to, H.323, Megaco H.248 Gateway Control Protocol, MGCP Media Gateway Control Protocol, RVP over IP Remote Voice Protocol Over IP Specification, SAPv2 Session Announcement Protocol SGCP, Simple Gateway Control Protocol, SIP Session Initiation Protocol, and Skinny Client Control Protocol (Cisco), VoIP (Voice over IP) standard media protocols, such as, but not limited to, DVB Digital Video Broadcasting, H.261 video stream for transport using the real-time transport, H.263 Bitstream in the Real-time Transport Protocol, RTCP RTP Control Protocol, and RTP Real-Time Transport, VoIP (Voice over IP) H.323 suite of standard protocols, such as, but not limited to, H.225 Narrow-Band Visual Telephone Services, H.225 Annex G, H.225E, H.235 Security and Authentication, H.323SET, H.245 negotiates channel usage and capabilities, H.450.1 supplementary services for H.323, H.450.2 Call Transfer supplementary service for H.323, H.450.3 Call Diversion supplementary service for H.323, H.450.4 Call Hold supplementary service, H.450.5 Call Park supplementary service, H.450.6 Call Waiting supplementary service, H.450.7 Message Waiting Indication supplementary service, H.450.8 Calling Party Name Presentation supplementary service, H.450.9 Completion of Calls to Busy subscribers supplementary Service, H.450.10 Call Offer supplementary service, H.450.11 Call Intrusion supplementary service, H.450.12 ANF-CMN supplementary service, RAS Management of registration, admission, status, T.38 IP-based Fax Service Maps, T.125 Multipoint Communication Service Protocol (MCS), VoIP (Voice over IP) SIP suite of standard protocols, such as, but not limited to, MIME (Multi-purpose Internet Mail Extension), SDP (Session Description Protocol), SIP (Session Initiation Protocol), PHY protocols including, but not limited to, LDVS—Low Voltage Differential Signaling, LVTTL—Low Voltage Transistor—Transistor Logic, LVCMOS—Low Voltage Complementary Metal Oxide Semiconductor, LVPECL—Low Voltage Positive Emitter Coupled Logic, PECL—Positive Emitter Coupled Logic, ECL—Emitter Coupled Logic, CML—Current Mode Logic, CMOS—Complementary metal-oxide-semiconductor, TTL—Transistor-Transistor Logic, GTL—Gunning Transceiver Logic, GTLP—Gunning Transceiver Logic Plus, HSTL—High-Speed Transceiver Logic, SSTL—Stub Series Terminated Logic, memory chip access protocols including, but not limited to, SDR (software defined radio), DDR (double data rate), QDR (quad data rate), RS Standards protocols including, but not limited to, RS 232, RS-422-B, RS-423-B, RS-449, RS-485, RS-530, RS 561, RS-562, RS 574, RS-612, RS 613, V-standards protocols including, but not limited to, V.10, V.11, V.24, V.28, V.35, Ethernet (MAC-PHY) protocols including, but not limited to, XGMII, RGMII, SGMII, GMII, MII, TBI, RTBI, AUI, XAUI, PCB Level Control protocols including, but not limited to, SPI, FC, MDIO, JTAG, fiber optic protocols including, but not limited to, SDH, CWDM, DWDM, backplane protocols including, but not limited to, VMEbus, PC 104, ATCA, SBus, and other protocols, such as, but not limited to, GFP, Actel and Atmel ARM Microprocessor buses including, but not limited to, Advanced Microcontroller Bus Architecture(AMBA), Advanced High performance Bus (AHB), Xilinx Microblaze microprocessor busses including, but not limited to, Fast Simplex Link (FSL), On-chip Peripheral Bus (OPB), Local Memory Bus (LMB), and Xilinx PowerPC microprocessor busses including, but not limited to, On-chip Peripheral. Bus (OPB), Processor Local Bus (PLB), Device Control Register (DCR) bus, Altera Nios II microprocessor bus including, but not limited to, Avalon Interface, and Latice LatticeMicro32 open IP microprocessor core bus including, but not limited to, Wishbone.

6) The SG Master device is also capable of operating as an XML-aware capable switch. The XML-aware capable switch receives XML data from the ultra wideband pulses or impulses over a conductive medium modem, makes decisions based on the XML header, opens the data packets, transforms or encrypts the XML data into a format that can be understood by the network, and transfers it to the non-ultra wideband pulses or impulses over wire communication modem. Also, the XML-aware capable switch receives XML data from the non-ultra wideband pulses or impulses over wire communication modem makes decisions based on the XML header, opens the data packets, transforms or encrypts the XML data into a format that can be understood by the network, and transfers it to the ultra wideband pulses or impulses over conductive medium modem. The XML data can be geographic data that can be used for routing and a wide variety of location-based services. The XML data can be network timing data that can be used for routing and for a wide variety of location-based services. The network timing data can originate from a GPS source. The SG Master device may also be capable of operating as a DataSpace switch as described in U.S. patent application Ser. No. 10/345,766, entitled System And Method For Storing/Caching Data On Transmission Infrastructure, which is hereby incorporated by reference in its entirety. The SG Master device may also be capable of operating as a structured linear database-aware switch as described in U.S. Pat. Nos. 6,868,419 and 6,868,419, entitled Method of Transmitting Data Including A Structured Linear Database, which are both hereby incorporated by reference in its entirety.

7) The SG Master device may be integrated directly into devices such as, but not limited to, modems, PC boards, set-top boxes, DLC equipment, on back-plane communications, computers, laptops, notebooks, PBXs, home networking devices, wireless/wire line switch (couplers), servers, powerline jumpers (breaker box), DSLAMs, ISLAMs, Cable TV head-end and field equipment, Cable TV CPE equipment, Broadband Powerline (BPL) head-end and field Equipment, BPL CPE equipment, in-building powerline communication system controllers, database controllers, etc.

Figure 4:
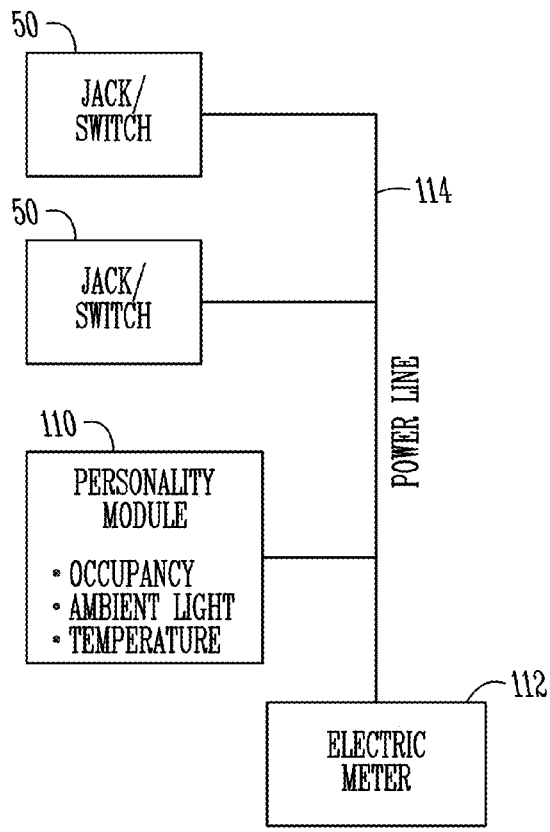
FIG. 4 illustrates one embodiment of a system such as may be used in a home.

FIG. 4 illustrates one example of a system of the present invention as may be used in a home. One or more jack devices 50 are electrically connected to a powerline 114. In addition one or more personality modules 110 are also electrically connected to the powerline 114. The powerline is electrically connected to the electric meter 112. The electrical meter 112 is isolated so that the jack devices operating in the house, commercial building, multiple dwelling unit (MDU), etc., cannot pass the boundary of the electrical meter 112.

Figure 5:
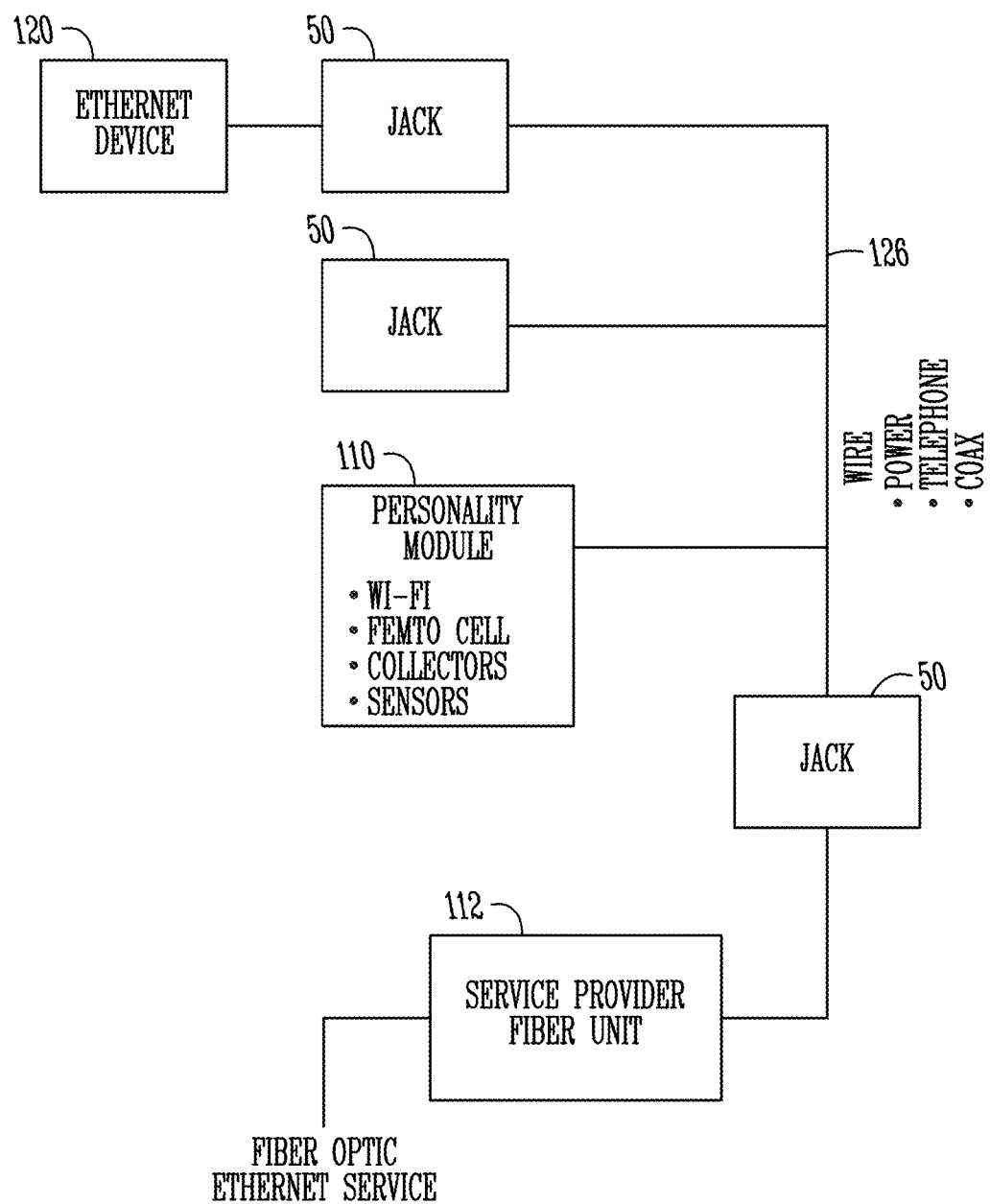
FIG. 5 illustrates one embodiment of a system such as may be used in a business.

FIG. 5 illustrates one example of a system of the present invention as may be used in a business. One or more jack devices 50 are electrically connected to a wired medium 26 such as power wires, telephone wires, or coax wires within the business. In addition, one or more ethernet devices 120 may be electrically connected to each jack 50. Network communications may be provided such as through a fiber optic ethernet service into a service provider fiber unit 122 associated with the business. Thus, in the embodiment shown in FIG. 4, Ethernet services are provided throughout the building though existing wiring structure.

The present invention may use communication, location, encoding, and messaging technology described in the following list of patents and patent applications all of which are all hereby included by reference in their entirety.

| application No. | Pat. No. | patent Title |
|---|---|---|
| | 6,707,424 | Integrated Positioning System And Method |
| | 6,868,419 | Method of Transmitting Data Including A Structured Linear Database |

-continued

| application No. | Pat. No. | patent Title |
|---|---|---|
| | 6,976,034 | Method of Transmitting Data Including A Structured Linear Database |
| | 6,980,566 | Method For Routing Data Packets Using An IP Address Based In GEO Position |
| | 7,123,843 | System And Method Of Using Variable Pulses For Symbology |
| | 7,181,247 | Globally Referenced Positioning In A Shielded Environment |
| | 7,340,283 | Globally Referenced Positioning In A Shielded Environment |
| | 7,376,191 | High Bandwidth Data Transport System |
| | 7,376,357 | System And Method Of Using Variable Pulses For Symbology |
| | 7,545,868 | Improved High Bandwidth Data Transport System |
| | 7,561,808 | System And Method Of Using Variable Pulses For Symbology |
| | 7,571,211 | Unified Message System |
| 10/345,766 | | System And Method For Storing/Caching Data On Transmission Infrastructure |
| 10/967,850 | | High Bandwidth Data Transport System |
| 10/967,859 | | System And Method Of Using Variable Pulses For Symbology |
| 11/118,928 | | Method And Apparatus For Multi-Band UWB Communications |
| 11/170,489 | | Method of Transmitting Data Including A Structured Linear Database |
| 11/318,283 | | Method For Routing Data Packets Using An IP Address Based In GEO Position |
| 11/740,731 | | Ultra Wideband Radio Frequency Identification System, Method, And Apparatus |
| 11/677,408 | | Improved High Bandwidth Data Transport System |
| 11/924,837 | | Globally Referenced Positioning In A Shielded Environment |
| 11/928,853 | | High Bandwidth Data Transport System |
| 11/932,841 | | Improved High Bandwidth Data Transport System |
| 11/932,365 | | Improved High Bandwidth Data Transport System |
| 11/932,459 | | Improved High Bandwidth Data Transport System |
| 11/932,254 | | Improved High Bandwidth Data Transport System |
| 11/946,084 | | Method of Transmitting Data Including A Structured Linear Database |
| 12/141,973 | | Improved High Bandwidth Data Transport System |
| 12/511,135 | | Unified Message System |
| 12/588,123 | | Method For Routing Data Packets Using An IP Address Based In GEO Position |

The communication patents in the previous list describe a technology which may be referred to herein as TIMEFLUX which allows for an improved high bandwidth data transport system. The SmartGrid system described herein may use a modified version of TIMEFLUX, which is sometimes referred to herein as TIMEFLUX SG (SG for SmartGrid). The basic modifications for use in the present invention as TimeFlux SG include:
1) Operational frequency range of approximately 50 kHz to 2 MHz
2) 62 frequency channels that are also Time Division Multiplexed into smaller frame sizes than standard TimeFlux, which are further grouped in MegaFrames, which are further grouped in UltraFrames to allow up to 50,000 Devices to operate on a single TimeFlux SmartGrid network.
3) Approximately 300 bps data rate per Ultra Jack device The TimeFlux SmartGrid system also isolates the electrical meter such that the SmartGrid devices operating in a house, commercial building, multiple dwelling unit (MDU), etc., cannot pass the boundary of the electrical meter.

A general description of the present invention, as well as a preferred embodiment, and alternative embodiments and aspects of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention, which is to be limited only by the claims, appended hereto.

What is claimed is:
1. A method for controlling electricity usage in at least one building through a jack device to a power consuming device comprising:
   identifying a user within a defined range of the jack device:
   communicating a set of predefined user preferences to the jack device based on the identified user;
   passing electric power from a powerline and through the jack device to the power consuming device;
   sensing characteristics of electricity being consumed by the power consuming device using the jack device;
   sending messages from the jack device about the characteristics of the electricity being consumed;
   receiving messages to control the passing of the electric power through the jack device to the power consuming device; and
   isolating an electric meter electrically connected to the powerline from the jack device.

2. The method of claim 1 wherein the jack device uses a pulse based protocol in sending the messages and receiving the messages through the powerline.

3. The method of claim 2 wherein the pulse based protocol uses pulses in the frequency range of 50 kHz to 2 MHz.

4. The method of claim 1 wherein the jack device includes RFID reader for communicating with the user located within the defined range of the jack device.

5. The method of claim 1 further comprising sensing by the jack device of an event trigger using an event trigger sensor.

6. The method of claim 1 further comprising sensing an environmental condition with an environment sensor of the jack device.

7. A jack device for use in a smart grid system, the jack device comprising:
- a housing;
- a plurality of prongs extending from the housing for plugging the jack device into an electrical outlet;
- a plurality of openings in the housing for receiving a plug of a power consuming device;
- a load sensing module disposed within the housing and configured to sense electrical load of the power consuming device;
- a first transceiver disposed within the housing for communication with a master device using a pulse based protocol;
- an intelligent control disposed within the housing and operatively connected to the load sensing module and the transceiver;
- a second transceiver disposed within the housing, said second transceiver configured to identify one or more users located within a predefined distance of the second transceiver and to transmit the identity of the one or more users to the intelligent control; and
- wherein the jack device is configured to send and receive messages using the transceiver.

8. The jack device of claim 7 wherein the second transceiver disposed within the housing is an RFID reader.

9. The jack device of claim 7 wherein the pulse based protocol uses pulses in the frequency range of 50 kHz to 2 MHz.

10. The jack device of claim 7 further comprising an environmental sensor operatively connected to the intelligent control.

11. The jack device of claim 7 further comprising an event trigger sensor operatively connected to the intelligent control.

12. The jack device of claim 7 further comprising a switch operatively connected to the housing for turning power on and off to the power consuming device.

13. The jack device of claim 7 wherein the messages are in an XML format.

14. A system comprising:
- a master device comprising a housing, a transceiver disposed within the housing; and an intelligent control disposed within the housing and operatively connected to the load sensing module and the transceiver;
- a plurality of jack devices, each of the plurality of jack devices comprising (1) a housing, (2) a plurality of prongs extending from the housing for plugging the jack device into an electrical outlet, (3) a plurality of openings in the housing for receiving a plug of a power consuming device, (4) a load sensing module disposed within the housing and configured to sense electrical load of the power consuming device, (5) a first transceiver disposed within the housing for communication with the master device using a pulse based protocol, (6) an intelligent control disposed within the housing and operatively connected to the load sensing module and the transceiver, and (7) a second transceiver disposed within the housing and configured to identify one or more users located within range of the second transceiver and to transmit the identity of the one or more users to the intelligent control, wherein each jack device is configured to send and receive messages using the transceiver.

15. The system of claim 14 wherein each of the plurality of jack devices includes an Ethernet interface.

16. The system of claim 14 wherein the pulse based protocol uses pulses in the frequency range of 50 kHz to 2 MHz.

17. The system of claim 14 wherein the transceiver of each of the jack devices communicates with the transceiver of the master device over a powerline delivering power to the electrical outlet.

18. The system of claim 14 wherein the second transceiver disposed within the housing is an RFID reader.

* * * * *